US012718499B2

(12) United States Patent
Wagliardo

(10) Patent No.: US 12,718,499 B2
(45) Date of Patent: Aug. 25, 2026

(54) MIXING AND SIMULCASTING EXTENDED REALITY CONTENT

(71) Applicant: MXR Holdings LLC, Dallas, TX (US)

(72) Inventor: Eric Wagliardo, Dallas, TX (US)

(73) Assignee: MXR Holdings LLC, Dallas, TX (US)

(*) Notice: Subject to any disclaimer, the term of this patent is extended or adjusted under 35 U.S.C. 154(b) by 90 days.

(21) Appl. No.: 18/625,434

(22) Filed: Apr. 3, 2024

(65) Prior Publication Data

US 2025/0166316 A1 May 22, 2025

Related U.S. Application Data

(60) Provisional application No. 63/602,234, filed on Nov. 22, 2023.

(51) Int. Cl.

*G06T 19/00* (2011.01)
*G06T 13/20* (2011.01)
*G06T 19/20* (2011.01)
*H04N 21/2187* (2011.01)
*H04N 21/6405* (2011.01)
*H04N 21/81* (2011.01)

(52) U.S. Cl.

CPC ............ *G06T 19/006* (2013.01); *G06T 13/20* (2013.01); *G06T 19/20* (2013.01); *H04N 21/2187* (2013.01); *H04N 21/6405* (2013.01); *H04N 21/8146* (2013.01); *G06T 2200/24* (2013.01); *G06T 2219/024* (2013.01); *G06T 2219/2004* (2013.01); *G06T 2219/2016* (2013.01)

(58) Field of Classification Search

CPC ....... G06T 19/006; G06T 13/20; G06T 19/20; H04N 21/6405

See application file for complete search history.

(56) References Cited

U.S. PATENT DOCUMENTS

2015/0332510 A1* 11/2015 Jovanovic .............. G06T 15/10 345/427
2022/0070239 A1* 3/2022 Yerli ..................... G06F 9/5077

FOREIGN PATENT DOCUMENTS

WO WO-2021101934 A1 * 5/2021 ......... H04N 21/2381

* cited by examiner

*Primary Examiner* — Daniel F Hajnik
*Assistant Examiner* — Joshua Jungwook Suo
(74) *Attorney, Agent, or Firm* — Scale LLP

(57) ABSTRACT

The disclosed system pertains to the generation, mixing, and simulcasting of extended reality (XR) content in real-time. The system includes a first data input source providing live data and a server computer. The server computer receives the live data and user input, enabling a user to select and configure at least one three-dimensional (3D) graphical object. The server computer renders a simulcast comprising a composite of the live data and an animation of the 3D graphical object, and outputs the simulcast to at least one display device. The live data can be video broadcast data, live performance video data, motion capture data, location data, or audio data. The animation is responsive to changes in the live data.

17 Claims, 7 Drawing Sheets

MIXING AND SIMULCASTING EXTENDED REALITY CONTENT

CROSS-REFERENCE TO RELATED APPLICATIONS

This application claims the benefit of U.S. Provisional Patent Application 63/602,234, filed 22 Nov. 2023, which is incorporated by reference herein in its entirety.

FIELD OF INVENTION

The present disclosure generally relates to the field of extended reality (XR), and more specifically, to systems, methods, and computer-readable media for generating, mixing, and simulcasting XR content in real-time.

BACKGROUND

Extended Reality (XR) is a term that encompasses the spectrum of experiences that blend the physical and digital worlds. It includes Augmented Reality (AR), Virtual Reality (VR), and Mixed Reality (MR). These technologies have been increasingly used in various fields, including entertainment, education, and healthcare, among others. XR technologies provide immersive experiences by overlaying digital information onto the real world (AR), immersing users in a fully digital environment (VR), or a combination of both (MR).

One of the primary components of XR is the creation and manipulation of three-dimensional (3D) graphical objects. These objects are typically created and manipulated using specialized software tools. The complexity and diversity of these tools often require a high level of technical expertise and training. Furthermore, the creation of 3D graphical objects is often a time-consuming process, particularly when high levels of detail and realism are desired.

Another aspect of XR involves the rendering of 3D graphical objects. Rendering is the process of generating an image from a model using computer programs. The quality of the rendered image is often dependent on the processing power of the hardware used. In the past, rendering high-quality images often took a considerable amount of time, which could limit the real-time application of XR technologies.

Simulcasting is a broadcasting technique where the same content is transmitted over multiple mediums or platforms simultaneously. Traditionally, the concept of simulcasting has been limited to simultaneously broadcasting content (e.g., a baseball game) on both television and radio stations. In the context of XR and the technological improvements described herein, simulcasting can now involve the simultaneous transmission of XR content over various display devices of different types. This can include conventional displays such as televisions and computer monitors, as well as specialized XR displays such as VR headsets and AR glasses.

Current solutions in the field of XR primarily rely on two-dimensional (2D) tools for the creation, manipulation, and rendering of graphical objects. These tools, while effective for generating 2D images, often fall short when it comes to creating immersive and realistic 3D environments. The use of 2D tools for 3D rendering often results in a loss of depth and realism, limiting the immersive experience that is central to XR technologies.

Given the limitations of existing 2D tools, there is a clear and pressing demand for solutions that leverage 3D geometry and generative animation. The use of 3D geometry would allow for the creation and manipulation of 3D graphical objects with a higher degree of detail and realism. This would enhance the visualization of the XR content, providing a more immersive and realistic user experience.

Generative animation, on the other hand, would enable dynamic and real-time manipulation of 3D graphical objects. This would allow for the creation of XR content that is responsive to changes in the live data, enhancing the interactivity and realism of the XR experience.

Furthermore, the use of 3D geometry and generative animation would reduce the number of software tools that are currently used in the XR pipeline. This would simplify the process of creating and rendering XR content, making it more accessible to non-technical artists and reducing the time and computational resources that are currently associated with these tasks.

Overall, the field of XR involves a complex interplay of various technologies and processes, including the creation and manipulation of 3D graphical objects, the rendering of these objects, and the simulcasting of the resulting content. Each of these aspects presents its own set of challenges and considerations.

SUMMARY OF INVENTION

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, the system includes a first data input source providing live data and a server computer. The server computer is configured to receive the live data from the first data input source and user input. The user input enables a user to select at least one three-dimensional (3D) graphical object and configure at least one characteristic of the 3D graphical object. The server computer is further configured to render a simulcast, which includes a composite of the live data and an animation of the at least one 3D graphical object. The server computer is also configured to output the simulcast to at least one display device.

According to other aspects of the present disclosure, the system may include one or more of the following features. The live data may be video broadcast data, live performance video data, motion capture data, location data, or audio data. The animation may be responsive to changes in the live data.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

Figure 1:
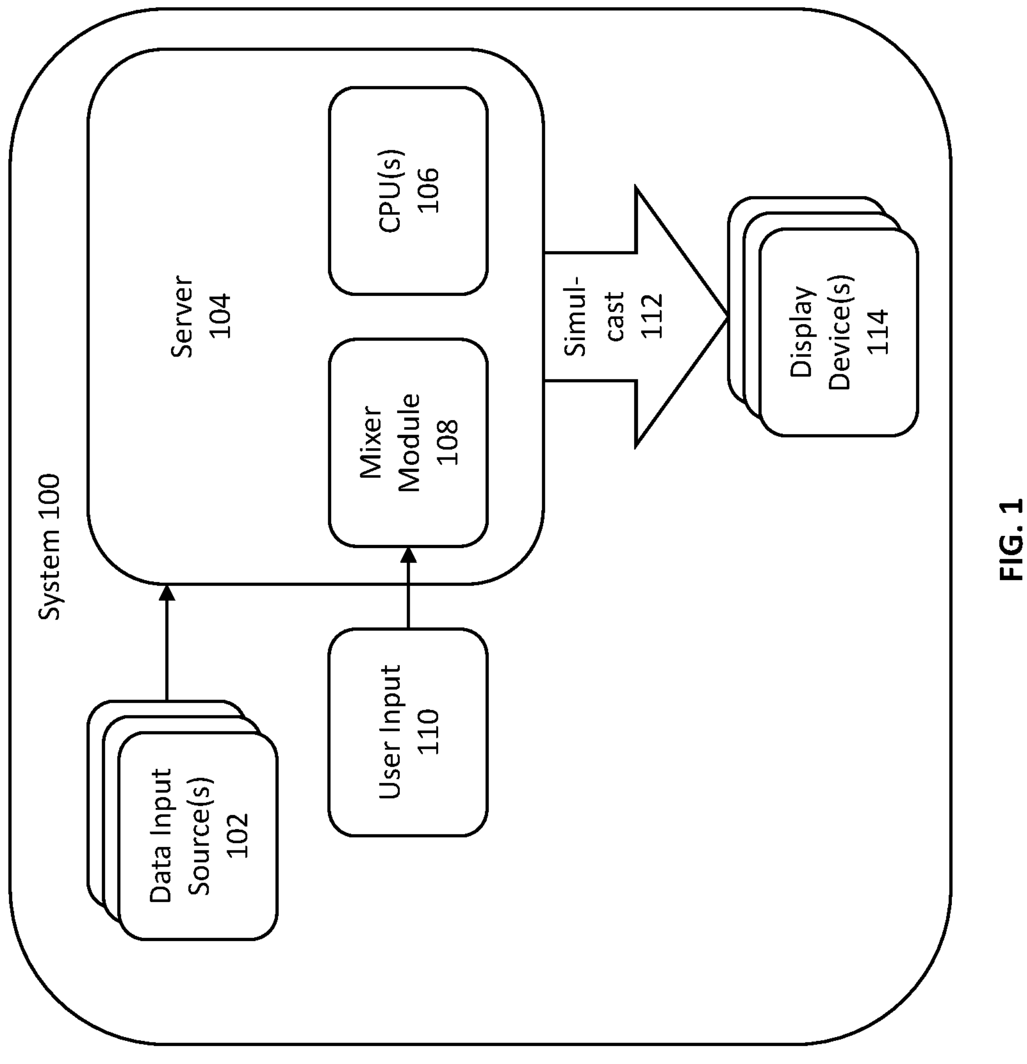
FIG. 1 illustrates a system architecture for mixing and simulcasting extended reality content, according to aspects of the present disclosure.

The following description sets forth exemplary aspects of the present disclosure. It should be recognized, however, that such description is not intended as a limitation on the scope of the present disclosure. Rather, the description also encompasses combinations and modifications to those exemplary aspects described herein.

The present disclosure generally relates to the field of extended reality (XR), and more specifically, to systems, methods, and computer-readable media for generating, mixing, and simulcasting XR content in real-time. XR is a term that encompasses a spectrum of experiences that blend the physical and digital worlds, including Augmented Reality (AR), Virtual Reality (VR), and Mixed Reality (MR).

In a TV show like American Idol, which has multiple contestants performing in each episode, embodiments of the present disclosure can rapidly enable a small team of in-house artists to create visuals at a higher fidelity in less time with less people than conventional solutions. The result is better visuals for less cost. Embodiments may also include new capabilities such as AR graphics and LED volume virtual stage effects. Similarly, a DJ performing at a venue may not have the budget for high-end 3D visuals, but at least some embodiments can enable such an artist to quickly compose these visuals and modify them on the spot or throughout a tour. This reduces the need for a content team, thereby enhancing visual fidelity and reducing costs.

XR content is also very expensive to develop and requires a high level of training and technical expertise. Embodiments of the present disclosure productize these development requirements allowing many non-technical teams to create content and power live events in VR, mobile AR, wearable AR and integrated experiences such as concerts with an AR overlay. The current workflow for many of the above productions typically requires rendering 3D graphics in conventional graphics programs. Once rendered, 3D geometry is flattened into 2D pixels. These moving flat images are imported into a tool designed to manipulate these pixels in real time. If multiple cameras are needed, multiple renders are required. If changes are needed, the content has to be re-rendered. Embodiments of the present disclosure can condense these steps into one and allow for multiple, varied camera angles, such as a TV shoot with multiple cameras or XR experiences where users are the cameraman.

Embodiments of the present disclosure include a creative tool for receiving inputs from a variety of sources, adding and manipulating 3D virtual objects, applying visuals and effects, and then simultaneously broadcasting these visuals in myriad forms such as 2D video, television broadcasts, VR, mobile AR, wearable AR and other nascent forms of communication. This “simulcast” may utilize a central server to direct the synchronized rendering of many more devices as needed for the particular medium. For example, embodiments may integrate with TV cameras to combine a video feed with camera position data, add real-time rendered visuals, and composite and output video for distribution, while simultaneously communicating the same visuals to a wearable AR headset so the devices can composite the special effects and animated content directly into the users' field of view. Additionally, 2D content may be rendered on a screen for consumption by casual observers. This multi-tiered and distributed approach (i.e., “simulcasting”) represents a funnel of Web 3.0 data inputs that are condensed, processed, and manipulated by embodiments disclosed herein and then transmitted back out to the Web 3.0.

In some aspects, the present disclosure provides a system that includes a first data input source providing live data and a server computer. The server computer is configured to receive the live data from the first data input source and user input. The user input enables a user to select at least one 3D graphical object and configure at least one characteristic of the 3D graphical object. The server computer is further configured to render a simulcast, which includes a composite of the live data and an animation of the at least one 3D graphical object. The server computer is also configured to output the simulcast to at least one display device.

In some cases, the live data may be video broadcast data, live performance video data, motion capture data, location data, or audio data. The animation may be responsive to changes in the live data. This system allows for the creation and manipulation of 3D graphical objects, the rendering of these objects, and the simulcasting of the resulting content. Each of these aspects presents its own set of challenges and considerations, which are addressed by the present disclosure.

Furthermore, the present disclosure provides a method for mixing and simulcasting extended reality content. The method includes receiving live data from a first data input source, receiving user input that enables a user to select at least one 3D graphical object and configure at least one characteristic of the 3D graphical object, rendering a simulcast that includes a composite of the live data and an animation of the at least one 3D graphical object, and outputting the simulcast to at least one display device.

In some embodiments, the present disclosure provides a computer-readable medium storing instructions that, when executed by a computer, cause the computer to perform a method for mixing and simulcasting extended reality content. The method includes receiving live data from a first data input source, receiving user input that enables a user to select at least one 3D graphical object and configure at least one characteristic of the 3D graphical object, rendering a simulcast that includes a composite of the live data and an animation of the at least one 3D graphical object, and outputting the simulcast to at least one display device.

Referring to FIG. 1, an overall system architecture 100 for mixing and simulcasting extended reality content is depicted. The system architecture 100 includes a plurality of data input sources 102. In some aspects, the data input sources 102 may provide audio, video, contextual, and/or other data that can be received and processed by a server computer (e.g., server 104). For example, the data input sources 102 can be one or more cameras and microphones capturing video and audio respectively at a live performance. The data input sources 102 can be a live video broadcast of a television show (the content of which can anything in which someone may wish to embed XR content). The data input sources 102 can provide contextual data. Contextual data can include information about the content that is being provided by data input sources 102. For example, contextual data can comprise the current position and/or orientation of a camera that is capturing video of a live performance. As the camera moves and/or changes its orientation, updated contextual data may be provided. Contextual data can also include information about real-world objects and corresponding planes in a three-dimensional space. For example, data input source 102 can be a hardware and/or software tool coupled with a camera that detects objects within the camera's field of view. In such cases, data input sources 102 can provide positional information of detected objects within the camera's field of view. Data input sources 102 can provide live data, including but not limited to video broadcast data, live performance video data, motion capture data, location data, and audio data. This flexibility allows the system to adapt to a wide range of input data types, enhancing its versatility and applicability in various XR scenarios.

Data input sources 102 can also include positional data. Positional data enhances the realism and interactivity of the XR content. Positional data refers to information about the location and orientation of objects within a 3D space. This data can be derived from various sources and can include different types of information, such as global geographic position information (e.g., global positional system (GPS) coordinates), virtual geographic position information (e.g., coordinates within a virtual world or other digital space), relative position information (e.g., coordinates with respect to a designated reference point), orientation information (e.g., gyroscopic information indicating how an object is oriented in the 3D space), movement information (e.g., acceleration information indicating how an object is moving through the 3D space), and edge information (e.g., information about the edges or boundaries of an object in the 3D space).

As depicted in FIG. 1 of the system architecture 100, the data input sources 102 can provide positional data to the server 104. For instance, the data input source 102 can be a hardware and/or software tool coupled with a camera that detects objects within the camera's field of view. In such cases, data input source 102 can provide positional information of detected objects within the camera's field of view. This positional information can be used to accurately place and orient 3D graphical objects within the XR content, enhancing the realism and immersion of the XR experience.

Moreover, the positional data can be used to dynamically update the XR content in response to changes in the live data. For instance, as a camera moves and/or changes its orientation during a live performance, updated positional data may be provided to the server 104. The server 104, in turn, can adjust the position and orientation of the 3D graphical objects within the XR content accordingly. This dynamic responsiveness to changes in the live data allows for real-time manipulation of the 3D graphical objects.

In addition to cameras, positional information can be captured with the assistance of other technologies such as laser systems (e.g., a LiDAR system), radar systems, sonar systems, and/or any other technology that is useful for identifying objects and their positions. In some embodiments, one or more software tools and/or machine learning systems can identify objects from image and/or video content and provide positional information as input in the present system.

In embodiments, data input sources 102 can provide input unrelated to objects or visual content. A data input source 102 can, for example, be a microphone that captures audio data (e.g., voices, music, and/or other sounds captured in a live environment). Data input source 102 can also provide input that is not audio or visual content, including input from keyboards, mice, joysticks, and gaming controllers, as well as input from other digital devices such as motion-capture equipment, lighting systems, and other performance-oriented equipment.

In embodiments of the present disclosure, the data input sources 102 can provide digital twin information. A digital twin is a virtual representation of a physical object or system, and in the context of XR, data input sources 102 can be used to create a digital twin of a real-world object or environment. For instance, video data from a live performance can be used to create a digital twin of the performance stage, while motion capture data can be used to create a digital twin of a performer's movements. Furthermore, location data can provide positional information that is used to accurately place and orient the digital twin within the XR content. This ability to create and manipulate digital twins in real-time enhances the realism and interactivity of the XR content, providing a more immersive and engaging user experience.

The data from data input sources 102 can come in the form of files, streams (e.g., over a network such as the Internet), live inputs (e.g., a line-in source), and/or virtually any other form of digital encoding in accordance with one or more protocols (e.g., MIDI, DMX, OSC, etc.). In some embodiments, the data can be analog data that is converted to a digital form through the use of one or more analog to digital converters.

In still other embodiments, data input sources 102 can include a wave generator (commonly referred to as a low-frequency oscillator or "LFO") that generates fluctuations based on a variety of wave forms, e.g., sine, triangle, square, and sawtooth waves. These waves create smooth and looping value changes of float data. Many animation techniques rely on the up and down motion of wave forms to simulate natural movement. For example, a saw tooth pattern creates a complete loop starting at 0, then progresses up to a given value (e.g., 360), and then starts over at 0 again. A saw tooth waveform can, for example, be used to create a smooth transition from 0 to 360 degrees then back to 0 degrees, effectively generating a complete rotation animation. Additionally, a square waveform is either at 0% or 100%. The binary state of the wave creates a switch for enabling or disabling states (e.g., a day/night environment, an on/off position of a virtual light, or the selection of different cameras in a scene). This functionality can form the basis of a simplistic programing language where a state can be changed similar to Boolean principles if than and or else. Embodiments of the present disclosure can thus abstract underlying code-based programming languages and recontextualize those underlying functions into a visual user interface that achieves similar results.

Still other data input sources 102 can be used with functional gates or switches where, for example, the volume of incoming audio can reach a threshold to turn characteristics and/or parameters on or off or make selections. Data input sources 102 can also be chained together creating a series of decision-making logic which drives the automation of various characteristic and/or parameter setting behaviors.

As discussed above, the system architecture 100 also includes one or more servers 104. The server 104 is configured to receive the live data from the data input sources 102. The server 104 may include one or more CPUs 106 that process the received data. The processing of data by the CPUs 106 may involve various operations such as data analysis, data transformation, data filtering, or other data processing tasks as appropriate for the specific application.

User input 110 is integrated into the system through a mixer module 108. The mixer module 108 comprises one or more hardware and/or software tools that interact with the server 104, facilitating the integration of user input into the data processing workflow.

In embodiments, server 104 can output a simulcast 112 to one or more display devices 114. Simulcast 112 can include the composite of one or more 3D animations and the input from one or more data input sources 102. The one or more display devices 114 can be connected locally (e.g., a direct wired or wireless connection) or remotely (e.g., over a network such as the Internet) to server 104. Display devices 114 can include one or more conventional displays (e.g., televisions, monitors, computer displays, and mobile device displays), virtual reality displays (e.g., VR headsets), augmented reality displays (e.g., AR glasses), holographic displays, theater displays, stadium displays, and/or any other devices capable of visually outputting graphical information.

In summary, the overall system architecture 100 as depicted in FIG. 1 illustrates the flow of data and user interaction within the system, highlighting the role of the server 104 in managing and distributing information. This architecture enables the generation, mixing, and simulcasting of extended reality content in real-time, providing an immersive and interactive extended reality experience.

Figure 2:
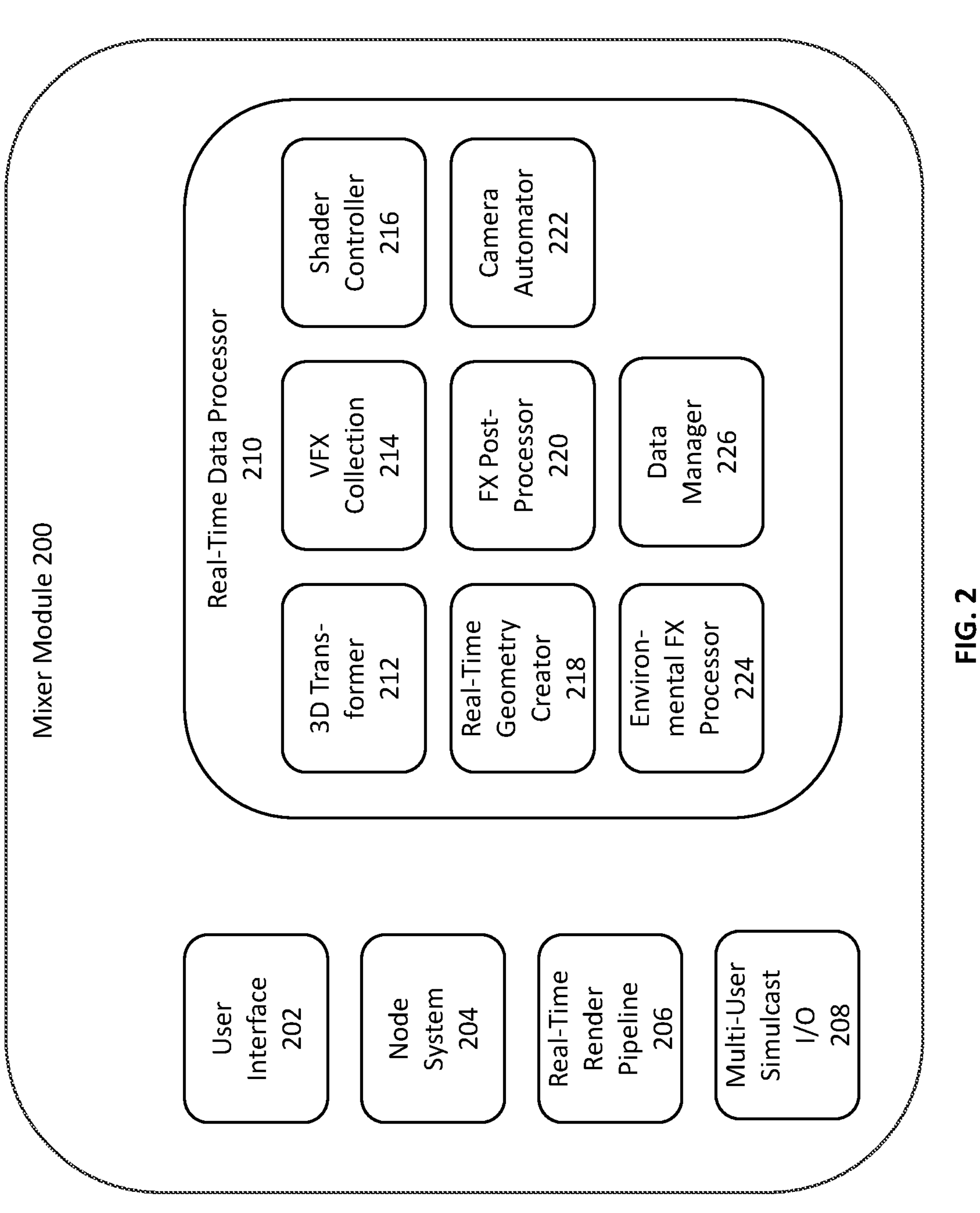
FIG. 2 depicts a detailed view of a mixer module within the system, showcasing various components and their interconnections, according to aspects of the present disclosure.

Turning now to FIG. 2, a detailed view of a mixer module 200 within the system is depicted. The mixer module 200 integrates several components, including a user interface 202, a node system 204, a real-time render pipeline 206, and a multi-user simulcast I/O 208.

Embodiments of mixer module 200 include a real-time data processor 210 for managing and distributing the flow of data among a plurality of sub-components or libraries associated with processing data in real time. These sub-components include a 3D transformer 212, a VFX converter 214, a shader controller 216, a real-time geometry creator 218, an FX post-processor 220, a camera automator 222, an environmental FX processor 224, and a data manager 226. Collectively, these elements facilitate the processing, transformation, and management of data and visual effects in real-time, enabling dynamic interactions and rendering for multi-user environments.

The 3D transformer 212 operates by programmatically manipulating the vertices of 3D objects. Vertices are the corner points of a 3D object, and by altering their positions, the shape and appearance of the 3D object can be dynamically changed. This manipulation is performed programmatically, meaning it is controlled by software algorithms rather than manual user input. This allows for more complex and precise transformations than would be possible with manual manipulation.

The 3D transformer 212 utilizes data inputs to guide the manipulation of 3D object vertices. These data inputs can come from a variety of sources, such as live data from data input sources 102, user input 110, or other data generated or processed within the system. In addition to data inputs, the 3D transformer 212 also utilizes shaders in the manipulation of 3D object vertices. Shaders are software programs that determine how 3D objects are rendered, including their color, texture, and lighting effects. The shader controller 216 may manage these shaders. By integrating shaders into the vertex manipulation process, the 3D transformer 212 can create more visually complex and realistic 3D objects.

Furthermore, the 3D transformer 212 can incorporate generative AI in the manipulation of 3D object vertices. Generative AI refers to artificial intelligence algorithms that can generate new data or content. In the context of the 3D transformer 212, generative AI can be used to create new shapes, animations, or visual effects for the 3D objects. This allows for a greater variety and complexity of 3D content.

VFX Collection 214 is a comprehensive collection of effects and/or particle systems that are designed to simulate the physics of fluid motion in a virtual environment. This collection supports the system's ability to create realistic and immersive XR content.

In embodiments, the VFX Collection 214 operates by using input data to drive a particle system. This particle system is capable of simulating the motion of various elements that exhibit fluid-like behavior. These elements can include, but are not limited to, fire, water, clouds, and other textures, backgrounds, and environments. By accurately simulating the motion of these elements, the VFX Collection 214 can create visually stunning and realistic XR content.

Furthermore, the VFX Collection 214 can include one or more preset effects. These preset effects are pre-configured settings or combinations of settings that can be used to quickly and easily generate specific visual effects. By providing these preset effects, the VFX Collection 214 simplifies the process of creating complex visual effects, making it more accessible to non-technical artists and reducing the time and computational resources that are currently associated with these tasks.

The shader controller 216 operates by programmatically manipulating the shaders of 3D objects. By controlling these shaders, the shader controller 216 can dynamically change the visual appearance of 3D objects. The shader controller 216 utilizes both programmatic and user inputs to guide the manipulation of shaders. Programmatic inputs can come from a variety of sources, such as live data from data input sources 102, other data generated or processed within the system, or generative AI algorithms. User inputs, on the other hand, are received through the user interface 202, allowing users to interactively control the visual effects of 3D objects.

In some embodiments, shader controller 216 is used to manipulate the texture of 3D objects. This includes, for example, changing the color and shininess of the objects, which can greatly affect their visual appearance and realism. For example, by adjusting the color of a 3D object, the shader controller 216 can simulate different lighting conditions or material properties. Similarly, by adjusting the shininess of a 3D object, the shader controller 216 can simulate different surface finishes, from matte to glossy.

In addition to basic texture manipulations, the shader controller 216 is also capable of performing advanced visual effects such as 3D transformations. For instance, the shader controller 216 can perform extrusions based on 2D data, effectively transforming 2D shapes into 3D objects. This capability allows for a greater variety and complexity of 3D content, enhancing the versatility and applicability of the system in various XR scenarios.

The real-time geometry creator 218 facilitates the creation of 3D geometry in real-time. Similar to the 3D transformer 212, the real-time geometry creator 218 leverages programmatic data inputs, shaders, and generative AI to enable users to create geometry from scratch. Programmatic data inputs can serve as the foundational building blocks for the creation of 3D geometry. These inputs can originate from a variety of sources, such as live data from data input sources 102, user input 110, or other data generated or processed within the system. The real-time geometry creator 218 processes these inputs to generate vertices, edges, and faces that define the shape and structure of the 3D geometry.

The FX post-processor 220 manipulates pixel data after the rendering process, utilizing shaders and raw elements from the render pipeline. The FX post-processor 220 operates by applying a series of post-processing effects to the rendered 3D scene. These effects are applied to the pixel data, transforming the 3D scene into a 2D image with enhanced visual effects. The post-processing effects are applied after the initial rendering process, allowing for additional visual enhancements that can improve the overall quality and realism of the rendered image.

In some embodiments, FX post-processor 220 can create 2D transforms. These transforms can alter the appearance of the rendered image in various ways. For example, the FX post-processor 220 can mirror the render to create a kaleidoscope effect. This effect can create visually striking patterns and symmetries, enhancing the aesthetic appeal of the rendered image. The FX post-processor 220 can also add lens flares to the rendered image. Lens flares can simulate the effect of light scattering within a camera lens, adding a sense of realism and depth to the rendered image. Furthermore, the FX post-processor 220 can perform color correction on the rendered image. Color correction can adjust the colors of the rendered image to achieve a desired aesthetic or to match the color grading of other content.

The camera automator 222 automates the animation of both virtual and In Real Life (IRL) cameras. This automation process is driven by data inputs, which can originate from a variety of sources such as live data from data input sources 102, user input 110, or other data generated or processed within the system. The camera automator 222 can control various camera characteristics and/or parameters, including zoom, lens settings, and transforms. The zoom control allows for the adjustment of the camera's field of view, enabling the user to focus on specific areas or objects within the 3D scene. The lens settings control can adjust various aspects of the camera's lens, such as the aperture, focal length, and focus distance. These adjustments can affect the depth of field, perspective, and sharpness of the rendered image.

The transforms control allows the camera to follow a virtual object or real object based on the data inputs. This can create dynamic camera movements that track the movement of the object, providing a more interactive and engaging user experience. For instance, in a virtual reality production, the camera could automatically follow an avatar as it moves through the virtual environment. Similarly, in a live broadcast of a music concert, the camera could automatically track the movement of a specific performer.

The Environmental FX Processor 224 generates and manages environmental effects in the XR content. This processor enhances the realism and immersion of the XR experience by simulating various environmental conditions and providing visually rich and dynamic backgrounds.

In some embodiments, the Environmental FX Processor 224 generates weather conditions. The processor can simulate a wide range of weather phenomena, including but not limited to thunderstorms, snowstorms, fog, and wind. Each of these conditions can be customized according to various characteristics. For instance, in the case of a rainstorm, the intensity of the rain can be adjusted to create anything from a light drizzle to a heavy downpour. Similarly, for wind, characteristics such as speed and direction can be manipulated to create different wind effects.

Moreover, the Environmental FX Processor 224 is capable of simulating cumulative effects over time. This includes phenomena such as snow accumulation during a snowstorm or the formation of rain puddles during a rainstorm. These time-dependent effects add a layer of realism to the XR content, as they mimic the natural progression of weather conditions in the real world.

In addition to weather conditions, the Environmental FX Processor 224 can also control the time of day in the XR content. This includes the simulation of day and night cycles, as well as transitional periods such as dawn and dusk. The ability to control the time of day allows for dynamic lighting conditions in the XR content, enhancing the visual appeal and realism of the scene.

Furthermore, the Environmental FX Processor 224 can provide static 360-degree backgrounds for the XR content. These backgrounds can depict various environments, such as a forest or a cityscape. The backgrounds are based on preset and/or generative AI imagery, allowing for a wide range of visually rich and detailed environments. The use of generative AI imagery enables the creation of novel and diverse backgrounds, enhancing the versatility of the XR content.

The Data Manager 226 acts as a sophisticated data router system within the Mixer Module 200, orchestrating the flow of data from the Node System 204 to various characteristic variables that control aspects of 3D objects, scenes, effects, etc. It maintains an ordered, dynamic data table that is central to the system's ability to route data efficiently and accurately to the intended destinations.

In operation, the Data Manager 226 enables users to assign specific data input sources to particular nodes within the Node System 204. For example, a user may assign a MIDI data input source to a node labeled "node 1" and then connect node 1 to a characteristic/parameter of a function, such as the color intensity of a 3D object's shader. The Data Manager 226 takes on the role of routing the MIDI data input to the corresponding function, ensuring that the characteristic/parameter is controlled by the incoming data stream.

This system eliminates the conventional coding requirements where a user would have to write code within the function itself to "listen" for particular data labels relevant to that function. Instead, the Data Manager 226 abstracts this complexity, allowing users to focus on the creative aspects of XR content creation without the burden of manual coding. By simplifying the data routing process, the Data Manager 226 opens up the system's capabilities to a broader range of users, including those with limited technical expertise.

The Data Manager 226's dynamic data table is continuously updated to reflect the current state of the system, including any changes in the data input sources or user configurations. This ensures that the data routing remains accurate and responsive to the user's interactions with the system.

In embodiments of the present disclosure, the node system 204 can process input data and convert it into one or more data streams (e.g., float and/or JSON data streams). This conversion process allows for the efficient handling of various types of input data. The node system 204 permits global modification of these streams and broadcasts them via internal data channels (e.g., by writing to JSON files). The node system 204 can manage the updating of a master data table, save states, and perform error correction.

In some cases, the real-time render pipeline 206 can render a composite of data from data input sources 102 and an animation of the at least one 3D graphical object. In some embodiments, the real-time render pipeline 206 can be or include one or more third-party rendering engines.

The multi-user simulcast I/O 208 can output graphical and/or spatial data to one or more output processors. The output can be platform agnostic, for example, by using a common file format like universal scene description (USD). This multi-platform output capability allows the system to deliver the extended reality content to a wide range of display devices, enhancing the accessibility and reach of the content.

Figure 3:
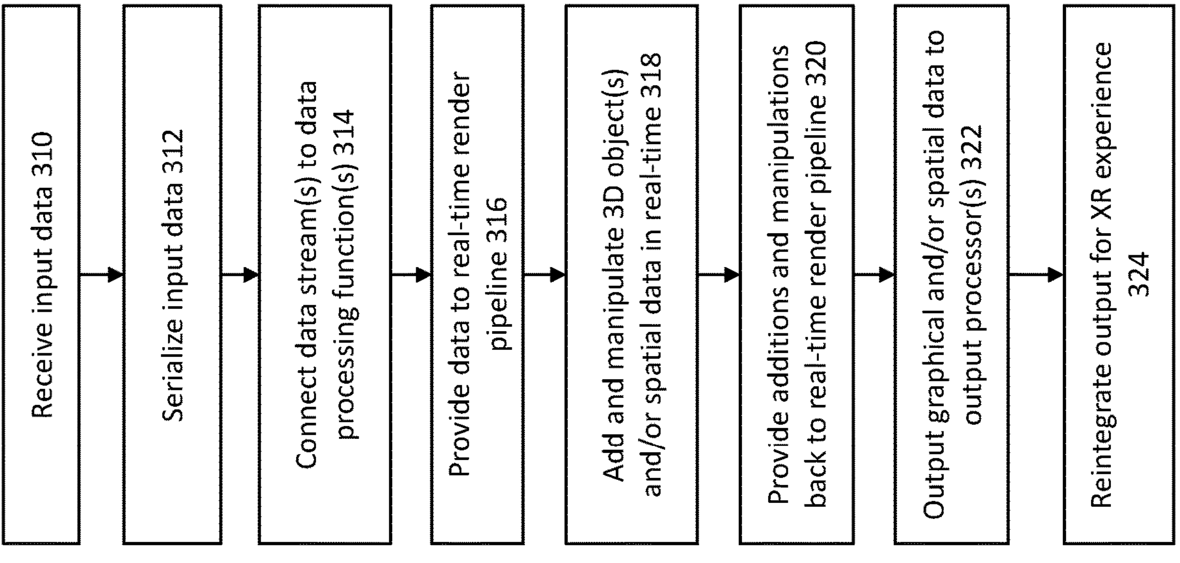
FIG. 3 presents a flowchart of a process for managing, rendering, and outputting data in an extended reality environment, according to aspects of the present disclosure.

Turning to FIG. 3, a flowchart of a process for managing and rendering data in a multi-user XR environment is depicted. The process begins at 310 with the receipt of input data as discussed above. At step 312, the input data is then processed and serialized into one or more data streams by a node system (e.g., node system 204), facilitating efficient handling and transmission of the data. Serialization is the process of converting a data object into a series of bytes that preserves the state of that object in an easily transmittable form.

At step 314, the user can connect the one or more data streams to one or more data processing functions. In embodiments, a user can, via a user interface (e.g., user interface 202) use a drag and drop method to connect a data input source to one or more object or visual effect characteristics. Following the receipt of user input, at step 316 the data stream(s) are provided to a real-time render pipeline such as a third-party rendering engine.

At step 318, further user input is received to add and manipulate 3D objects and/or spatial data in real-time. Next, at step 320, the additions and manipulations are provided back to the real-time render pipeline.

At step 322, the output from the real-time render pipeline, consisting of graphical and/or spatial data, is then transmitted through a multi-user simulcast interface to one or more output processors. In some cases, the output processors can include, for example, show controls, AR or television video feeds, cluster rendered LED volume stages, and/or XR applications.

Finally, at step 324, the output from the output processors can be reintegrated to provide an XR experience to an audience.

Figure 4:
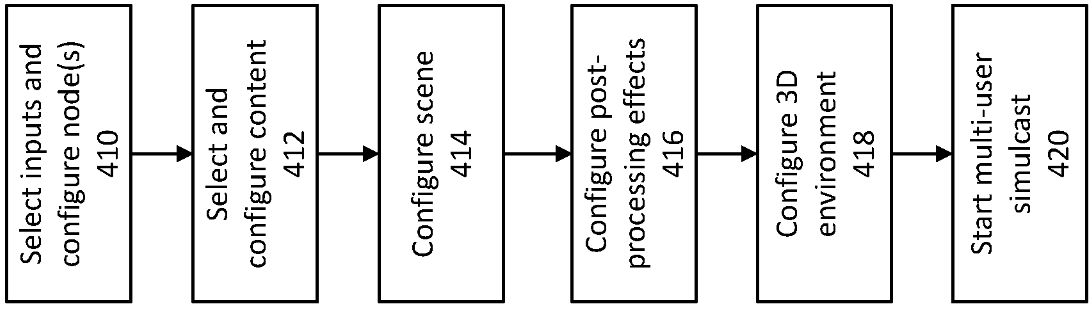
FIG. 4 shows a flowchart of a process for preparing a simulcast, according to aspects of the present disclosure.

Referring now to FIG. 4, a flowchart of a process for setting up a multi-user simulcast is depicted. The process begins at step 410 with selecting inputs and configuring data input sources. The process then proceeds to step 412 for selecting and configuring content. In some cases, the content may include one or more three-dimensional (3D) graphical objects selected and configured by a user.

At step 414, the scene can be configured. In some aspects, scene configuration may involve setting up the spatial layout of the 3D graphical objects, adjusting the lighting conditions, setting the camera angles, or other scene configuration tasks. Scene configuration can include one or more scene tools, such as an outliner, which presents a list of objects in a particular scene as well as a plurality of settings that may be configured for each of the objects. One group of settings can, for example, be organized by 3D axis (X axis, Y axis, and Z axis). Exemplary 3D axis settings can comprise speed, amplitude, frequency, and radius. Other groups of settings can comprise transform, location, rotation, scale, particle systems, and styling. In embodiments of a user interface (e.g., user interface 202) one or more of the settings can use slider controls for simplified fine-tuning of each setting.

At step 416, a user can configure one or more post-processing effects. In some cases, the post-processing effects may include visual effects applied to the rendered visuals as 2D modifications. These effects may include adjusting brightness, inverting colors, or performing color correction.

At step 418, a user can configure the 3D environment. In some aspects, this step may involve setting up the environmental characteristics such as the atmospheric conditions, the time of day, the weather conditions, or other environmental characteristics.

In some embodiments of the present disclosure, each of steps 414, 416, and 418 is optional and the executed steps can be performed in any order.

The final step 420 is to start a multi-user simulcast. As discussed above, a simulcast may include a composite of the input data and an animation of one or more 3D graphical objects. The composite is then outputted, via one or more output processors, to one or more display devices.

Figure 5:
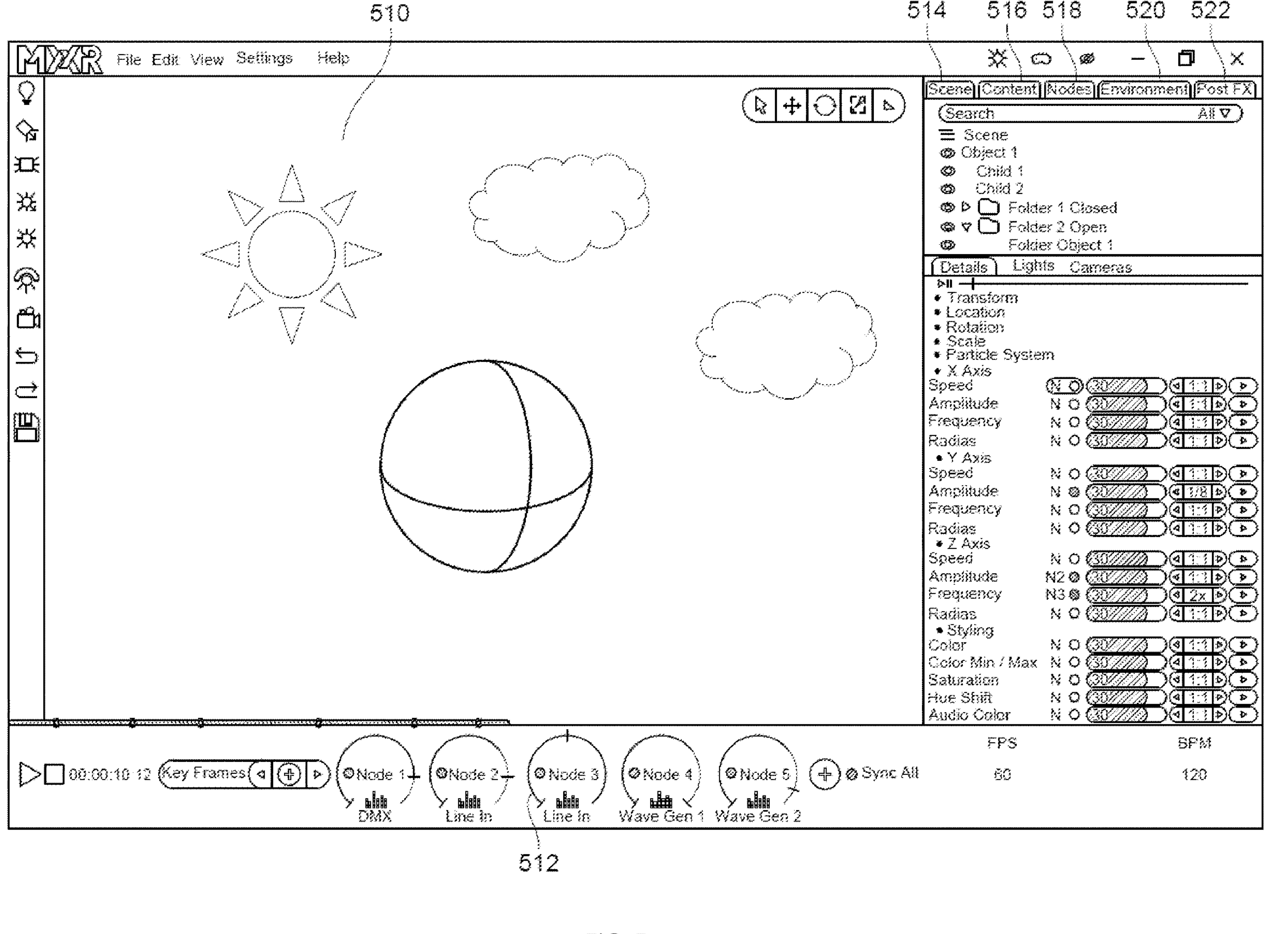
FIG. 5 displays a graphical user interface for a digital content creation tool, according to aspects of the present disclosure.

Referring now to FIG. 5, a graphical user interface for a digital content creation tool is depicted. The interface includes a render area 510 where the visual content is displayed. In some aspects, the render area 510 may provide a real-time view of the 3D scene being created or manipulated by the user. This real-time view may enhance the user's ability to interact with the 3D scene and make adjustments as desired.

Surrounding the render area 510 are various control panels and configurations. Node controls 512 provide interactive elements for viewing and configuring data input sources (also referred to herein as "nodes"). As discussed above, in some embodiments, users can use a drag and drop method to connect a node to one or more objects or visual effect characteristics and/or parameters (e.g., shaders). For example, a user can use a mouse to "grab" a node indicator from the bottom control panel, navigate to the desired object or characteristic widget and "drop" the node connection onto the object or characteristic widget. The node indicator can then change color indicating that the node is connected.

Node controls 512 can also enable a user to perform various functions on the data input sources similar to how a DJ may mix a plurality of audio tracks in real-time. For example, a user can use the node controls 512 to quickly enable/disable a node, adjust a node's volume or other frequently accessed characteristic, and view a real-time active state of each node. Users can also quickly add new nodes, enable/disable syncing across nodes, and view the current frame rate of visual content (e.g., in frames per second) and tempo of audio content (e.g., in beats per minute).

In embodiments of the present disclosure, variables, characteristics, and/or parameters can include size, position, rotation, color, etc. Visual effects such as a particle emitter can receive the stream of data from a node to change how many particles are emitted, the particle size, color, texture, etc. Embodiments of the present disclosure can include other effects, such as an artificial weather system that can change the time of day, cloud composition, precipitation, etc. Geometry and surface textures (i.e., shaders) can also be modified in this way. The node controls 512 enable a user to control the manipulation of the above behaviors from a central location. Each characteristic can also modify incoming data such as by adding a user input value. The characteristic widget can also multiply or divide an incoming value on a per characteristic basis, reverse and multiply inputs, and perform other transforms of incoming data.

As discussed above, scene configuration 514 allows for modifications to the overall scene settings. In some aspects, the scene configuration 514 may include settings for the lighting conditions, camera angles, background images, or other overall scene characteristics. This configurability may allow the user to set up the 3D scene in a manner that suits their specific requirements or preferences.

Content selection 516 enables the user to choose specific content elements to work with. In some cases, the content selection 516 may include a library of pre-defined 3D objects, textures, materials, or other content elements that the user can add to the 3D scene. This content selection capability may enhance the user's ability to create rich and detailed 3D scenes.

Additionally, node configuration 518 offers detailed contextual settings for individual nodes/data input sources. For example, if the data input source is a wave generator, the adjustable settings can include the type of waveform, frequency, amplitude, etc. If the data input source is a line input, the settings can, for example, include gain, minimum and maximum volumes, and one or more equalizer controls.

Environment configuration 520 allows for adjustments to the environmental characteristics. In some cases, the environment configuration 520 may include settings for the atmospheric conditions, time of day, weather conditions, or other environmental characteristics. This configurability may allow the user to create 3D scenes with a wide range of environmental conditions, enhancing the realism and immersion of the extended reality content.

Post-processing configuration 522 provides options for applying visual effects after the initial rendering process. In some aspects, the post-processing configuration 522 may include settings for color correction, lens flares, vignettes, chromatic aberration, or other post-processing effects. These effects may enhance the visual quality of the rendered 3D scene, providing a more visually appealing extended reality experience.

In summary, the graphical user interface as depicted in FIG. 5 provides a comprehensive set of controls and configurations for creating and manipulating 3D scenes in real-time. These elements are arranged to facilitate an efficient workflow, allowing users to create and modify digital scenes with precision and ease. This interface may enhance the user's ability to generate, mix, and simulcast extended reality content, providing an immersive and interactive extended reality experience.

In embodiments of the present disclosure, user input can be provided in the form of natural language (e.g., spoken or typed). This feature allows users to interact with the system in a more intuitive and user-friendly manner, as they can use everyday language to create and manipulate 3D content in real-time. Natural language processing (NLP) is a field of artificial intelligence that focuses on the interaction between computers and humans through natural language. The goal of NLP is to read, decipher, understand, and make sense of human language in a valuable way. In the context of the disclosed system, NLP can be used to interpret user commands given in natural language and translate them into actions that the system can perform.

For example, a user might say or type "create a red ball at the center of the scene". The NLP component of the system would parse this command, identify the action ("create"), the object to be created ("a red ball"), and the location for the object ("at the center of the scene"). The system would then execute the command by creating a 3D model of a red ball and placing it at the specified location in the 3D scene.

The NLP component of the system can be driven by machine learning models that are trained on how to use the system. These models (e.g., large language models or LLMs) can be trained on a large dataset of example commands and their corresponding actions, allowing the models to learn the patterns and structures of natural language commands. The trained models can then be used to predict the actions corresponding to new commands, enabling the system to understand and execute a wide range of user commands. A generative pretrained transformer (GPT), for example, is a type of model that can generate content from text and/or image inputs. The NLP component of the system can include one or more GPT models for transforming user input into command-based output (e.g., instructing the system to perform specific functions) and/or generative output (e.g., create new content).

Furthermore, the use of machine learning models allows the NLP component to improve over time. As the system is used, it can collect more data on the commands given by users and their corresponding actions. This data can be used to further train the machine learning models, improving their ability to understand and execute user commands. This continuous learning process allows the system to adapt to the specific language usage patterns of its users, enhancing its usability and effectiveness.

Figure 6:
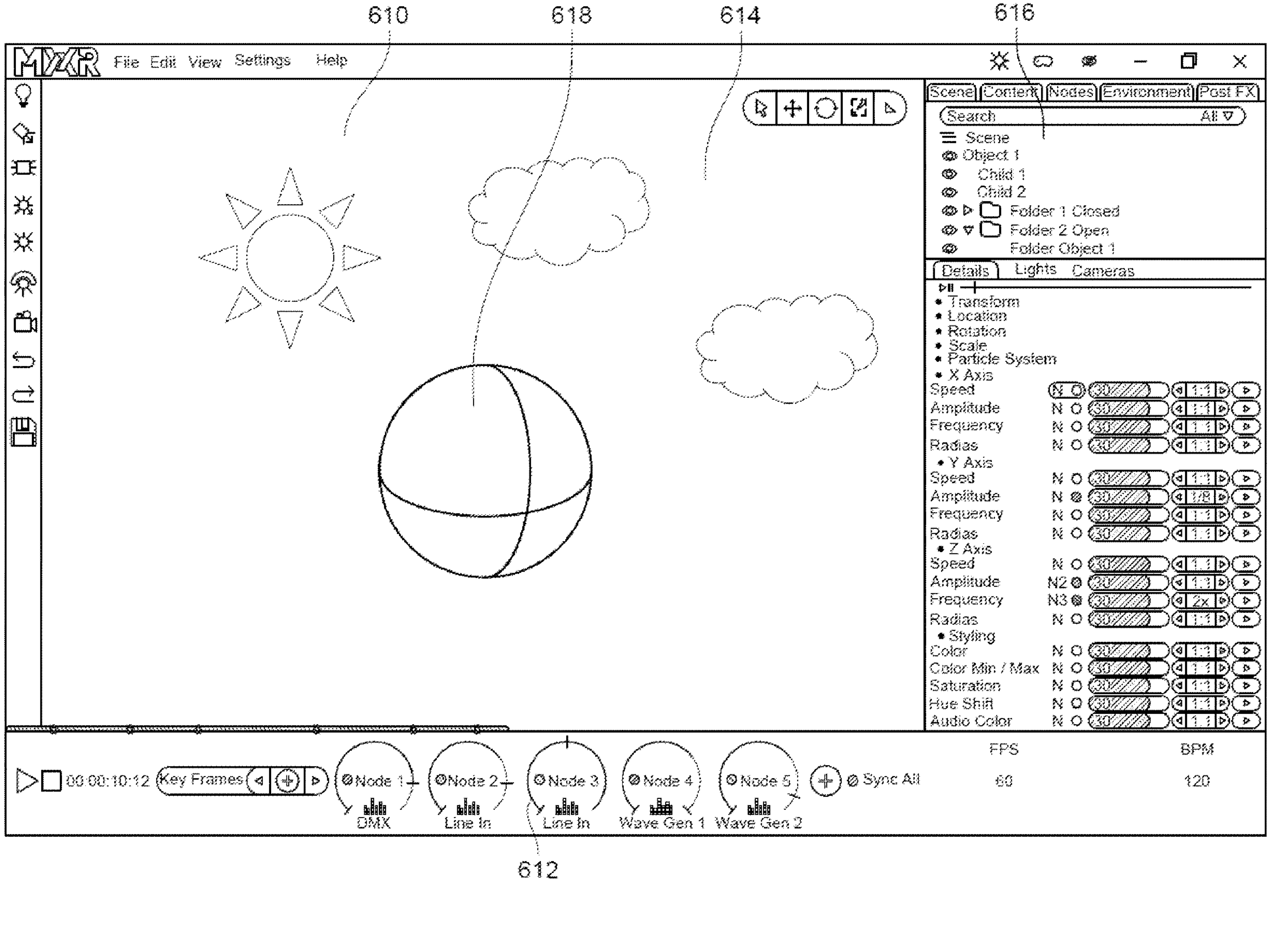
FIG. 6 depicts a graphical user interface for real-time manipulation of 3D objects and spatial data, according to aspects of the present disclosure.

Referring now to FIG. 6, a diagram of a mixed reality system for real-time manipulation of 3D objects and spatial data is depicted. The system includes a render area 610, which may provide a real-time view of the 3D scene 614 being created or manipulated by the user.

Connected to the render area 610 is the content selection 616. In some aspects, the content selection 616 may include a library of pre-defined 3D objects, textures, materials, or other content elements that the user can add to the 3D scene 614. This content selection capability may enhance the user's ability to create rich and detailed 3D scenes.

Within the 3D scene 614, 3D virtual objects 618 are displayed and can be manipulated. In some cases, the 3D virtual objects 618 may be responsive to changes in the live data. In an example embodiment, a user can add a 3D virtual object 618 such as a sphere to a 3D scene 614. The user can configure the 3D scene's characteristics, for example, to reflect a daytime environment in which it is snowing. The user can then assign one or more nodes, using node controls 612, to one or more characteristics of the 3D virtual object 618. For example, if the node control 612 identified as "node 1" is a wave generator, the user can "drag" (e.g., using a mouse, touch interface, or other input device) "node 1" to a position characteristic (e.g., the x-axis) of the 3D virtual object 618 (i.e., the sphere). As the "node 1" wave generator generates a stream of value changes of float data, the sphere's position on the x-axis of the 3D scene 614 will dynamically change accordingly. This dynamic responsiveness allows for real-time manipulation of the 3D virtual objects 618.

The real-time render pipeline processes the user input and updates the 3D scene 614 accordingly, ensuring that changes are reflected in real-time within the render area 610. This real-time rendering capability allows for immediate visual feedback on the user's manipulations, providing a more intuitive and responsive user experience.

In summary, the system as depicted in FIG. 6 provides a comprehensive set of tools and interfaces for creating and manipulating 3D scenes in real-time. These elements are arranged to facilitate an efficient workflow, allowing users to create and modify digital scenes with precision and ease. This system may enhance the user's ability to generate, mix, and simulcast extended reality content, providing an immersive and interactive extended reality experience.

Figure 7:
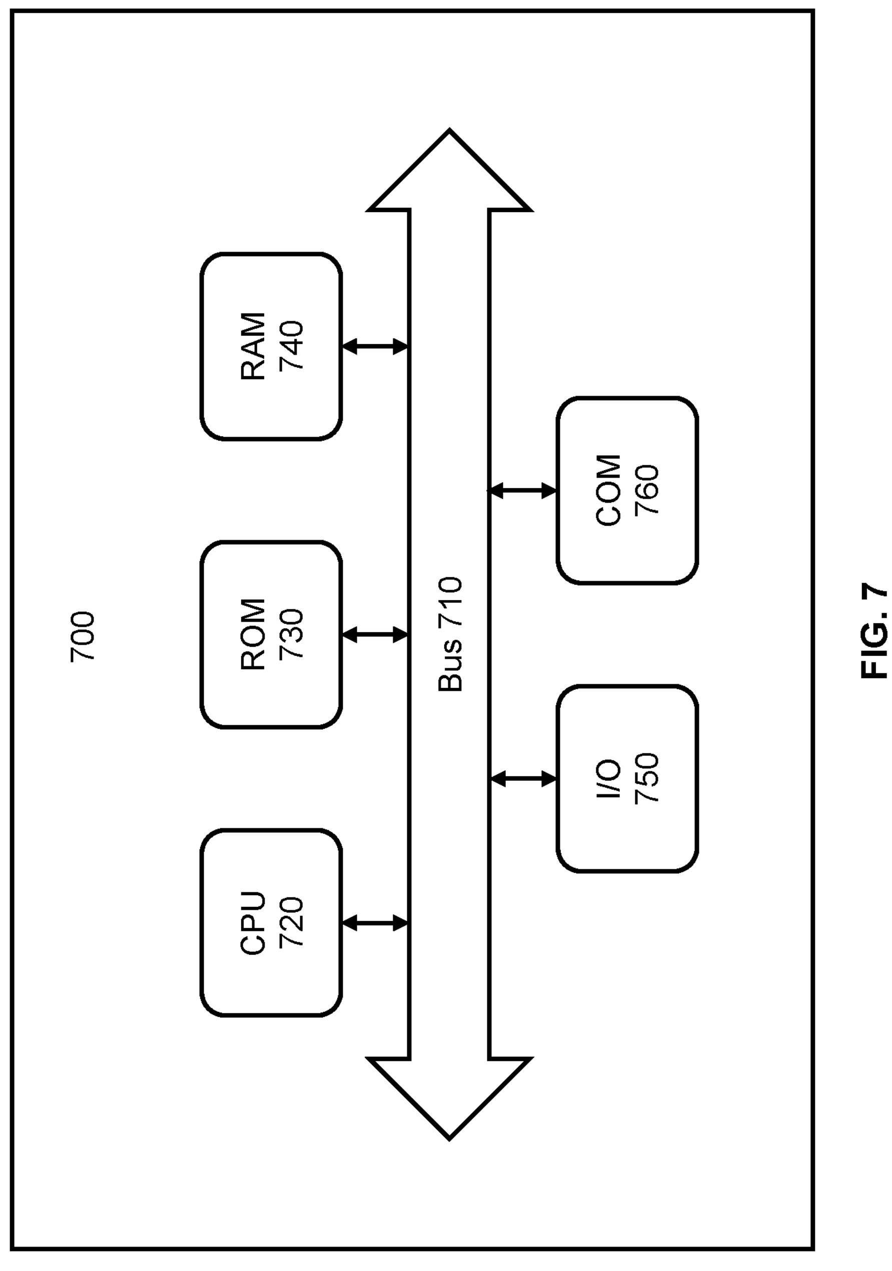
FIG. 7 illustrates a block diagram of a computer system architecture that may be used to implement the disclosed system, according to aspects of the present disclosure.

FIG. 7 depicts an example processing system (or "processor") 700 that may be configured to execute techniques presented herein. Processor 700 can be a platform, as it may not be a single physical computer infrastructure. Processor 700 may include a data communication interface 760 for packet data communication, and it may also include a central processing unit ("CPU") 720, in the form of one or more processors, for executing program instructions. Processor 700 may include an internal communication bus 710, and the platform may also include a program storage and/or a data storage for various data files to be processed and/or communicated by the platform such as ROM 730 and RAM 740, although the processor 700 may receive programming and data via network communications. The processor 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the processor 700 may be implemented by appropriate programming of a single computer hardware platform.

A number of implementations have been described. Nevertheless, it will be understood that various modifications may be made without departing from the spirit and scope of the disclosure. Accordingly, other implementations are within the scope of the following claims.

The invention claimed is:

1. A system for mixing and simulcasting extended reality content, comprising:

a first data input source configured to provide live data;

a server computer including a mixer module comprising a node system, a real-time render pipeline, and a multi-user simulcast input/output interface, the server computer configured to:

receive the live data from the first data input source;

receive user input, via the mixer module, that enables a user to select at least one three-dimensional (3D) graphical object and configure at least one characteristic of the 3D graphical object by connecting, in the node system, the live data to the at least one characteristic, wherein a data manager routes serialized data streams produced by the node system to the at least one characteristic without requiring code execution within functions of the 3D graphical object;

render, in the real-time render pipeline, a simulcast comprising a composite of the live data and a generative animation of the at least one 3D graphical object, the generative animation being responsive in real-time to changes in the live data provided via the node system; and output, via the multi-user simulcast input/output interface, the simulcast simultaneously to a plurality of display devices including at least one conventional display and at least one extended reality display.

2. The system of claim 1, wherein the at least one characteristic of the 3D graphical object comprises at least one of: color, texture, size, shape, position, orientation, or motion.

3. The system of claim 1, wherein the server computer is further configured to receive additional user input to modify the at least one characteristic of the 3D graphical object in real-time during the simulcast.

4. The system of claim 1, wherein the plurality of display devices is selected from the group of a virtual reality headset, an augmented reality headset, a monitor, a television, a mobile device, or any combination thereof.

5. The system of claim 1, wherein the server computer is further configured to receive user input of a drag and drop method to connect a data input source to one or more characteristics of the 3D graphical object.

6. The system of claim 1, wherein the simulcast is transmitted to the plurality of display devices through one or more output processors selected from the group of show controls, a television video feed, a cluster rendered LED volume stage, and an extended reality application.

7. The system of claim 1, wherein the live data from the first data input source comprises positional data of at least one detected object within a camera's field of view, and the server computer is further configured to use the positional data to accurately place and orient the 3D graphical object.

8. The system of claim 7, wherein the server computer is further configured to use the positional data to dynamically update the position and orientation of the 3D graphical object in response to changes in the live data.

9. The system of claim 1, wherein the user input can be provided in the form of natural language processing driven by a machine learning model.

10. A method for mixing and simulcasting extended reality content, comprising the steps of:

receiving live data from a first data input source;

via a server-hosted mixer module comprising a node system, receiving user input that enables a user to select at least one three-dimensional (3D) graphical object and to configure at least one characteristic of the 3D graphical object by connecting, in the node system, the live data to the at least one characteristic, wherein a data manager serializes the live data into one or more data streams and routes the one or more data streams to the at least one characteristic without requiring code execution within functions of the 3D graphical object;

providing the routed one or more data streams to a real-time render pipeline and rendering a simulcast comprising a composite of the live data and a generative animation of the at least one 3D graphical object, the generative animation being responsive in real time to changes in the live data; and simultaneously outputting, via a multi-user simulcast input/output interface, the simulcast to a plurality of display devices including at least one conventional display and at least one extended reality display.

11. The method of claim 10, wherein the at least one characteristic of the 3D graphical object comprises at least one of: color, texture, size, shape, position, orientation, or motion.

12. The method of claim 10, further comprising receiving additional user input to modify the at least one characteristic of the 3D graphical object in real-time during the simulcast.

13. The method of claim 10, wherein the plurality of display devices is selected from the group of a virtual reality headset, an augmented reality headset, a monitor, a television, a mobile device, or any combination thereof.

14. The method of claim 10, further comprising user input of a drag and drop method to connect a data input source to one or more characteristics of the 3D graphical object.

15. The method of claim 10, wherein the simulcast is transmitted to the plurality of display devices through one or more output processors selected from the group of show controls, a television video feed, a cluster rendered LED volume stage, and an extended reality application.

16. The method of claim 10, wherein the live data from the first data input source comprises positional data of at least one detected object within a camera's field of view, and further comprising using the positional data to accurately place and orient the 3D graphical object.

17. The method of claim 16, further comprising using the positional data to dynamically update the position and orientation of the 3D graphical object in response to changes in the live data.

* * * * *